Patented Dec. 29, 1936

2,066,212

UNITED STATES PATENT OFFICE 2,066,212

PROCESS FOR THE ACTIVATION OF BENTONITES

Elmore McKellar, Winnipeg, Manitoba, Canada, assignor of one-half to Reginald Roderick Cooper, Winnipeg, Manitoba, Canada No Drawing. Application October 7, 1935, Serial No. 43,986

4 Claims. (Cl. 252—2)

In refining oils, whether vegetable, animal or mineral, the usual practice is to pass the same through a filtering or bleaching medium to remove impurities and improve the color. In refining the oils, two processes may be employed: one the direct contact method where the oil and a clay of the fuller's earth type are mixed together, the mixture agitated, heated, and the oil then recovered by filter pressing; the second consists in passing the hot oil through a tower of clay under pressure. The fine texture of the clay removes the impurities, while the clay itself appears to have an affinity for the coloring matter, the affinity capacity varying with different clays. Linseed, lard and vegetable oils for shortening such as cottonseed, and peanut are passed through a mixture of clay and carbon black for special requirements in decolorizing.

Many clays of the type used in the above process are found on the North American continent and other countries and are generally known as bentonites. Bentonites are, quite often, similar in appearance and their chemical and mineralogical compositions, in some cases, almost identical. Many however, are wholly inactive for filtering or decolorizing; some having a low colloidal composition, in the raw state, are very good for filtration but their bleaching or decolorization properties are low or non-existent. The highest grade of bentonites, having both filtration and decolorization properties are rare and found only in a few parts of the continent and as they are usually of a high colloidal composition, require an activating process before they can be used for refining. A few raw clays, having low viscosity and acidity, (principally found in Georgia and Colorado) require no activation and are especially valuable for bleaching oils used for lards and shortenings as they impart no acid to the oils in the refining process, but their decolorizing capacity is not as high as activated clays. Clays of the filtration or decolorizing types are usually found under the class known as subbentonites. Those bentonites having an alkaline base and which cannot be changed to an acid have practically no decolorizing properties.

The activating process, for bentonites used in refining, consists in first drying the clay, then crushing or grinding the material to a suitable powder, digesting the powder in a tank with various proportions of sulphuric or hydrochloric acid and usually boiling the mixture with live steam. It is then drained, washed, filtered, dried and subsequently crushed to the fineness desired. In the washing, considerable water is required to remove the free acid.

While the activating process destroys the viscidity and renders certain constituents soluble, the treated clay retains the combined acids which renders it useless in refining linseed or the lard and shortening oils mentioned, as acid is imparted to the oil, in the refining operation, and later causes oxidation resulting in discoloration and early deterioration due to rancidity. The acid in such processed oil might be reduced by neutralization, but this would require another operation to remove the sludge and the cost would be prohibitive. Accordingly, the activated clays are principally used to refine petroleum products where a low acidity is not serious.

The object of the present invention is to provide an activating process for colloidal bentonite clays which will reduce the acidity of the resultant activated clay to a point where it may be used to refine the linseed and edible oils mentioned without imparting acid thereto.

A further object of the invention is to obtain the above results while also securing all the decolorizing advantages of the activated clays which are nearly 100% greater than the present non-activated crude clay on the market.

A further object of the invention is to control the degree of reduction in the acidity of the activated clay.

A still further object of the invention is to obtain the above results without excessive water washing and so secure, not only a saving in costs, but a larger quantity of activated clay from the original crude.

A still further object of the invention is to reduce the time taken in completing the process.

With the above important objects in view which will become more apparent as the description proceeds, the invention resides in the ingredients and process of using the same hereinafter more particularly described, it being understood that the amounts specified in the present formula are in proportion to each ton of bentonite clay used. The amounts may be varied considerably.

The clay is first dried, either by solar or generated heat, then pulverized to a powder of at least 100 mesh. It is then placed in an acid resistant digesting tank, diluted with a solution of from 300 lbs. minimum to 1200 lbs. maximum of sulphuric acid and 5000 lbs. of water and boiled for three or more hours with live steam until digested. The activating treatment destroys the viscidity, makes the undesirable mineral salts soluble in the water and the acid attacks the alumina for later partial removal. The tank is then filled with water, the material agitated and left to settle. The surplus water and acids are then drained off. At this time, the dissolved sulphates and sulphides and some iron and alumina combinations pass out with the drainage. The sludge is transferred by decantation or rotary filter into another tank, again washed with fresh water, agitated, left to settle, and then the surplus water drained. The above described activating process is well known in the industry and is therefore not claimed as new.

The clay, at this time, still retains a high percentage of free and combined acids which would render it useless for refining. These acids may comprise some of the sulphuric acid used in the activating process or may be caused by water ($H_2O$) combining with other ingredients in the clay to form sulphuric acid ($H_2SO_4$) or silicic acid ($H_2SiO_3$). Other ingredients in the clay, when combined, tend to give an acid reaction. Water washing has heretofore been continued to further reduce the free acid but this greatly increases the activating costs while the acid content can only be reduced to approximately 3.5%. In the present process, this washing is avoided while the acidity may be reduced to neutral.

After the second washing is completed, the clay is treated with a strong solution of caustic soda (or other alkaline base salt) and water which distributes evenly through the mass to neutralize the acid and bring the clay to any acid reaction desired by the industry concerned. The acids, so neutralized, are thus formed into inert salts that do not require removal from the finished product. As no further washings are required, many fine particles of clay, which ordinarily pass out in the washings, are salvaged thus increasing the percentage of useful activated clay. Further, as the settling of relative high acidic clay sludge is faster than the relative low acidic washed clay sludge, less time is taken to complete the process when neutralization is used. The complete saving amounts to hours. The clay is then dried and ground by a ball or hammer mill to a fine powder (usually 200 mesh).

By removing a sample of the clay, before neutralization, a test will reveal the degree of acidity. The quantity of alkali required to neutralize the sludge to any given acid reaction can be computed so accurately that the product may be produced to low percentage specifications or neutral.

It has generally been assumed that alkali destroys the decolorizing properties of bentonite clays. It was found that if too much alkali is used in the neutralizing process, the clay will have an alkaline base and accordingly very little decolorizing power. As practically no researches have been conducted to use or measure the pH values as a method of comparing and controlling the decolorization properties of the clays, the neutralization principle has been entirely overlooked. This might be accounted for by the fact that so many common clays have pH values almost identical with the standard commercial clays but are wholly lacking in decolorization power. Even the standard clays themselves have varied pH values. Further, as some of the beds in the United States, producing raw clays for the purpose, were so extensive, such researches were no doubt considered unjustified.

The above process has been successfully used on Manitoba clays known as the "white beds of subbentonite interlaid by black bands of carbonaceous shale" found in the Pembina mountain districts around Thornhill, Miami and Winkler and named such by Hugh Spence of the Department of Mines, Ottawa. In the mining of these particular beds, the black shale is removed before shipment to the plant. Commercial tests have been conducted by a large Winnipeg oil refinery, formerly using a high grade of Colorado raw clay for refining vegetable oils. The results, using clays neutralized to 0.056% acid, have definitely proven that the local activated neutralized clay is 100% more efficient in decolorizing properties and the saving of carbon black than the Colorado clay, the filtering in both cases is the same, no acid is imparted to the oil, while the finished product is claimed to be superior.

In the tests conducted the local activated neutralized clay has been found far superior not only to the imported clay mentioned but the best American and expensive German clays. The cost of activating has been materially reduced, permitting a lower price to the consumer, while his saving is augmented by using less clay for the refining process. It has been estimated that the activating cost is reduced 25% and when proper equipment is installed, the reduction may amount to 50%. A better bleach is secured on lubricating oils and other petroleum products while the product undoubtedly, will be extremely useful for reclaiming used crank case oil.

It is believed that the above process will prove equally satisfactory for many beds of similar clay found throughout Western Canada and the United States.

A general analysis of the white clay from the above mentioned Pembina Mountain districts is as follows:

| | |
|---|---|
| $SiO_2$ | 61.50 |
| $Fe_2O_3$ | 1.23 |
| $Al_2O_3$ | 19.00 |
| $CaO$ | 1.19 |
| $MgO$ | 7.10 |
| $K_2O$ | 0.40 |
| $Na_2O$ | 0.30 |
| $SO_3$ | 0.63 |
| Ignition loss | 9.00 |
| | 100.32 |

Soluble in $H_2O$—0.59%

| | |
|---|---|
| $SiO_2$ | 0.10 |
| $MgO$ | 0.60 |
| Alk. by diff. | 0.18 |
| Volatile | 0.25 |
| | 0.59 |

What I claim as my invention is:

1. The process of preparing an oil refining earth which consists in boiling a crude clay of the bentonite or subbentonite class in a container with a water diluted solution of a mineral acid, draining off the surplus liquids, washing the clay with fresh water free of salts, then draining the same, and then permeating the drained sludge with a water diluted alkali solution of a concentration sufficient to neutralize remaining acid to obtain proper pH value of the product.

2. The process of preparing an oil refining earth for filtering and decolorizing purposes which consists in activating a crude clay with a water diluted mineral acid to remove viscidity and render certain constituents soluble, draining the surplus salts, acids and other liquids, washing the residue with water free of salts and redraining, commingling an acid neutralizing solution with the drained sludge to obtain proper pH value of the product, and dehydrating the mixture for later crushing.

3. A method of producing a clarifying and decolorizing earth for refining oils which consists in treating a clay of the bentonite type with a water diluted solution of a mineral acid at boiling temperature to remove viscidity and render certain constituents soluble, draining the surplus liquids, washing the insoluble residue with water free of salts and draining to remove the surplus soluble elements and treating the resultant drained sludge with an alkaline solution to neutralize the acid reacting ingredients to a desired pH value on the acid side, and then drying the insoluble residue.

4. The process of preparing an oil refining earth which consists in boiling a crude clay of the bentonite or subbentonite class in a container with a water diluted solution of a mineral acid, draining off the surplus liquids, washing the clay free of salts with fresh water free of salts, then draining the same, and then permeating the drained sludge with a sodium hydroxide solution sufficient to neutralize the remaining acid and acid reacting ingredients to obtain proper pH value of the product.

ELMORE McKELLAR.